US012651819B2

(12) United States Patent
Kim et al.

(10) Patent No.: US 12,651,819 B2
(45) Date of Patent: Jun. 9, 2026

(54) CLAMPING APPARATUS FOR ANTENNA DEVICE

(71) Applicant: KMW INC., Hwaseong-si (KR)

(72) Inventors: In Ho Kim, Yongin-si (KR); Hee Kim, Osan-si (KR); Dae Myung Park, Hwaseong-si (KR); Young Ji Hong, Hwaseong-si (KR); Ju Hun Lee, Anyang-si (KR); Jae Woo Choi, Paju-si (KR); Woo Kyung Lee, Gwangmyeong-si (KR); Gyeong Tae Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 222 days.

(21) Appl. No.: 18/650,659

(22) Filed: Apr. 30, 2024

(65) Prior Publication Data

US 2024/0283126 A1 Aug. 22, 2024

Related U.S. Application Data

(63) Continuation of application No. PCT/KR2022/016529, filed on Oct. 27, 2022.

(30) Foreign Application Priority Data

Nov. 3, 2021 (KR) ........................ 10-2021-0149769
Oct. 26, 2022 (KR) ........................ 10-2022-0139325

(51) Int. Cl.
*H01Q 1/12* (2006.01)
*H01Q 1/24* (2006.01)

(52) U.S. Cl.
CPC ......... *H01Q 1/1264* (2013.01); *H01Q 1/1228* (2013.01); *H01Q 1/246* (2013.01)

(58) Field of Classification Search
CPC ...... H01Q 1/12; H01Q 1/1207; H01Q 1/1228; H01Q 1/1242; H01Q 1/125; H01Q 1/1264; H01Q 1/246; H01Q 1/42; H01Q 3/08
See application file for complete search history.

(56) References Cited

U.S. PATENT DOCUMENTS 10,944,169 B2 * 3/2021 Clifford ................. H01Q 1/125
2021/0328342 A1 * 10/2021 Clifford ................. H01Q 3/005

FOREIGN PATENT DOCUMENTS

JP S62-044509 U 3/1987
JP S62-077904 U 5/1987
(Continued)

OTHER PUBLICATIONS

Office Action mailed on Jun. 10, 2025 from Japanese Patent Office for Application No. 2024-525690.
(Continued)

*Primary Examiner* — Robert Karacsony

(57) ABSTRACT

The present invention relates to a clamping apparatus for an antenna device, the clamping apparatus including an antenna mounting bracket coupled to a rear surface of an antenna device and configured to support the antenna device, a steering drive unit coupled to be rotatable in a horizontal direction relative to a support pole mounting bracket installed on a support pole, a tilting drive unit movably coupled to the steering drive unit, and at least one tilting link member configured to rotate the tilting drive unit relative to the steering drive unit and move the antenna mounting bracket relative to the tilting drive unit during tilting and steering operations, thereby providing an advantage of ensuring a maximum of tilting adjustment range of the antenna device.

15 Claims, 17 Drawing Sheets

(56) References Cited

FOREIGN PATENT DOCUMENTS

| | | | |
|---|---|---|---|
| JP | 2006-211110 | A | 8/2006 |
| KR | 10-0862143 | B1 | 10/2008 |
| KR | 10-2016-0084707 | A | 7/2016 |
| KR | 10-2004127 | B | 7/2019 |
| KR | 10-2095871 | B1 | 4/2020 |
| KR | 10-2145150 | B1 | 8/2020 |
| KR | 10-2021-0102085 | A | 8/2021 |
| WO | 2021080299 | A1 | 4/2021 |

OTHER PUBLICATIONS

International Search Report mailed Feb. 1, 2023 for International Application No. PCT/KR2022/016529 and its English translation.
Office Action mailed on Feb. 2, 2026 from The Vietnamese Intellectual Property Office for Application No. 1-2024-03652.

* cited by examiner

[FIG. 1]
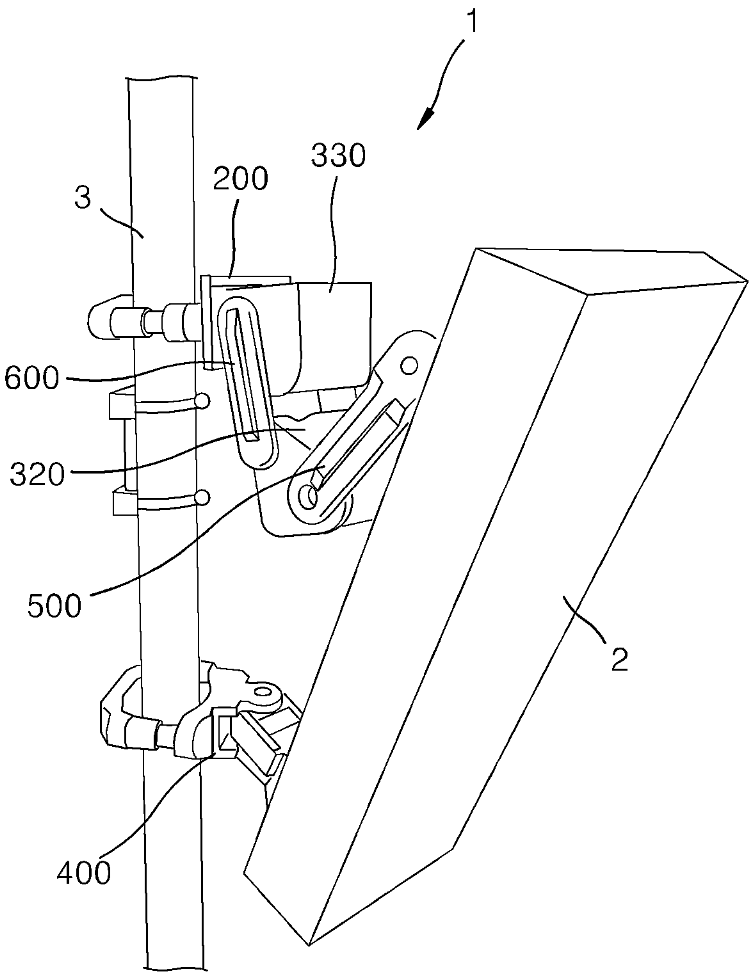

[FIG. 2]
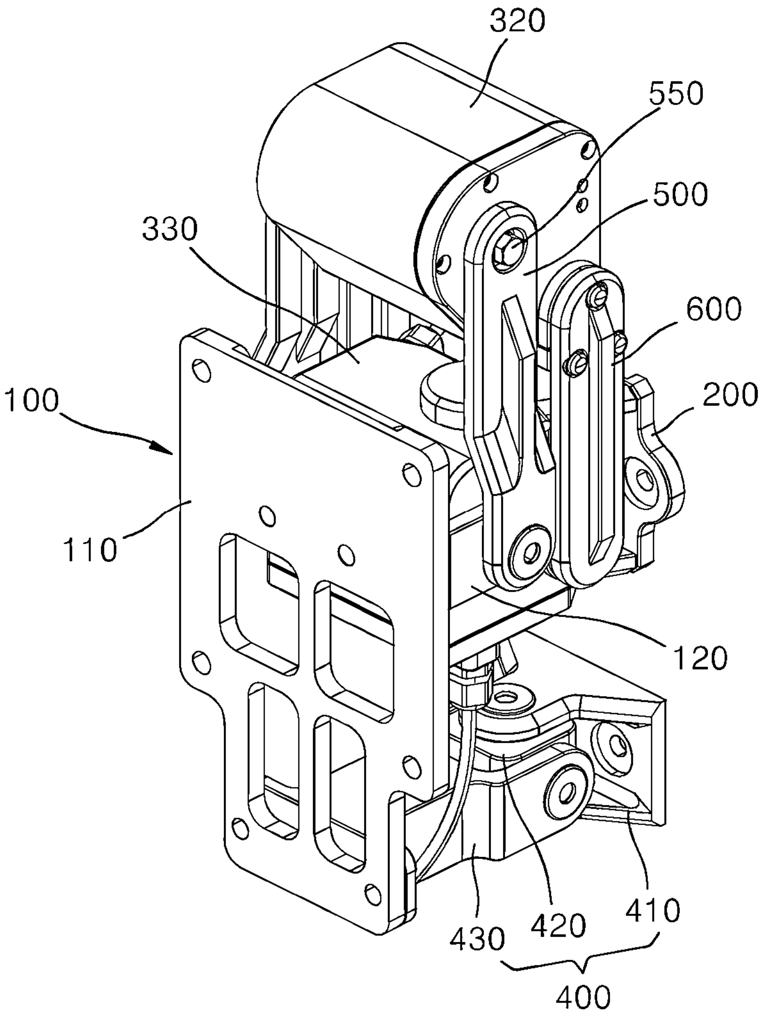

[FIG. 3]
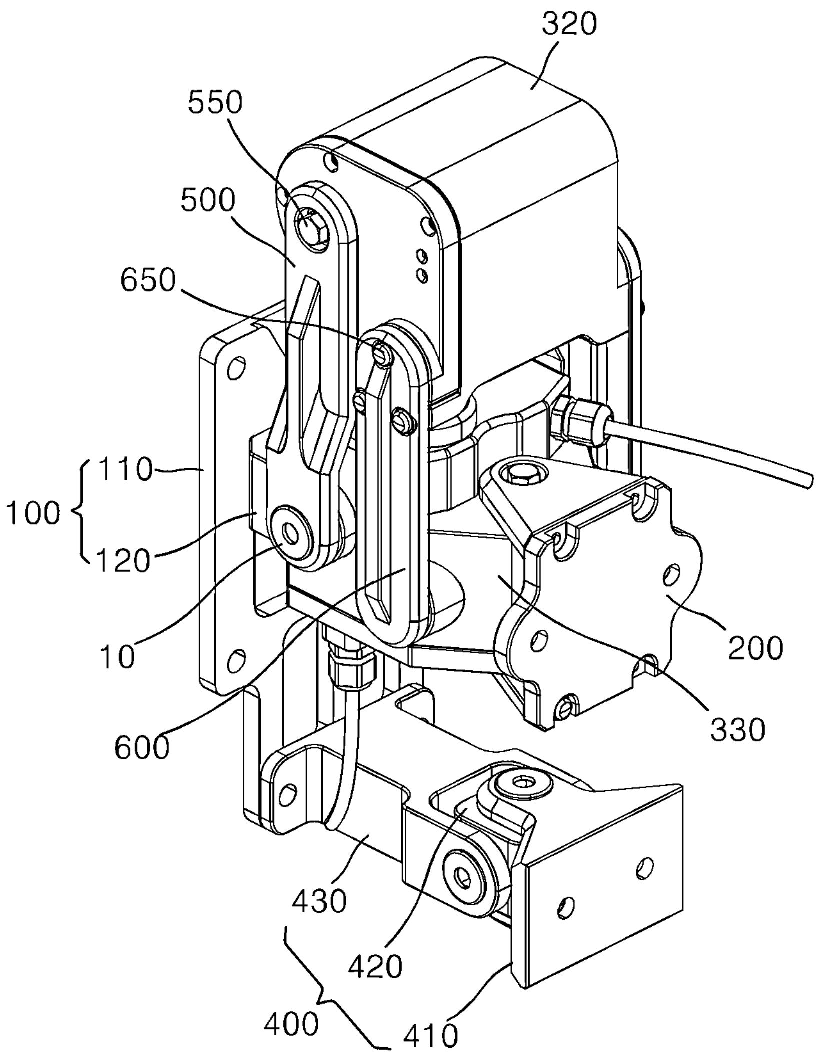

[FIG. 4]
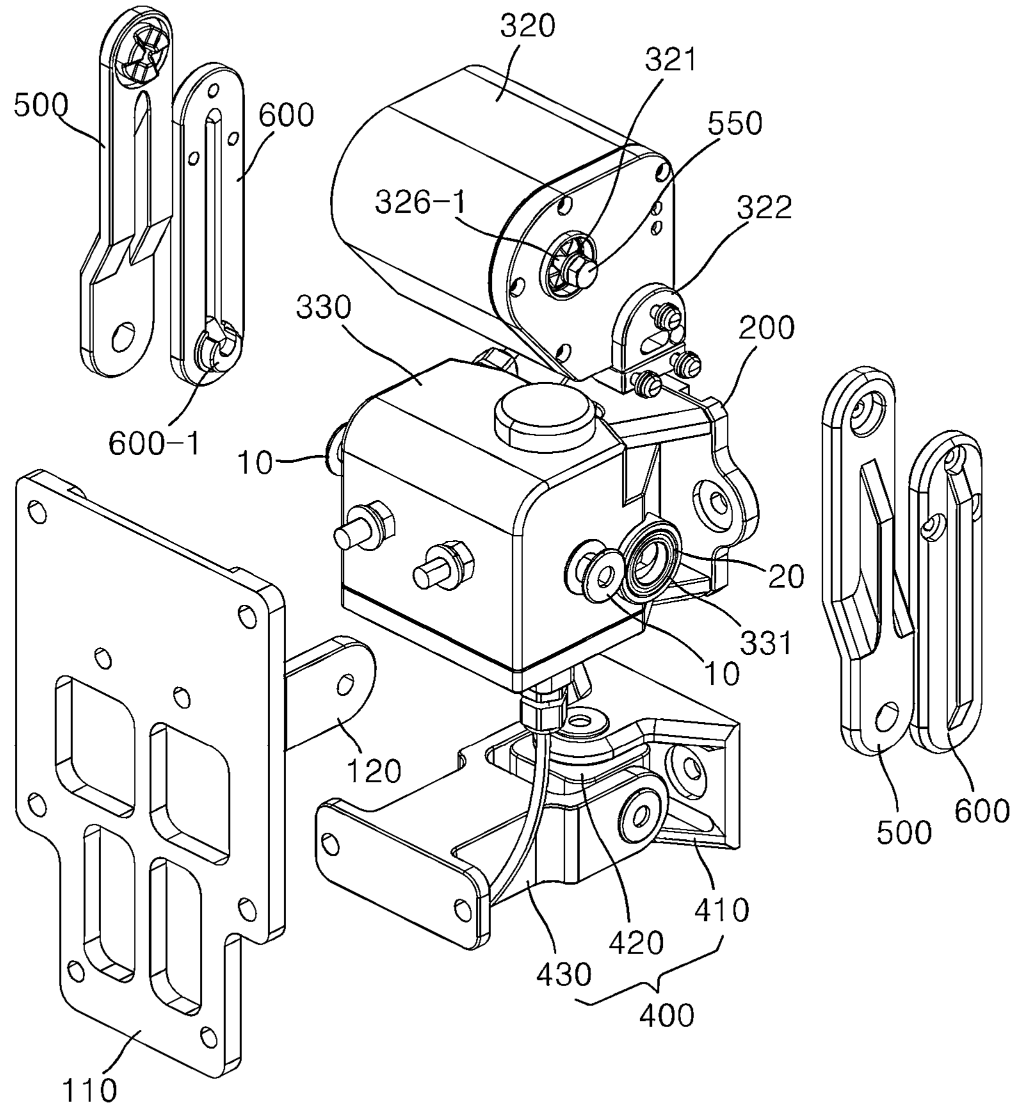

[FIG. 5]
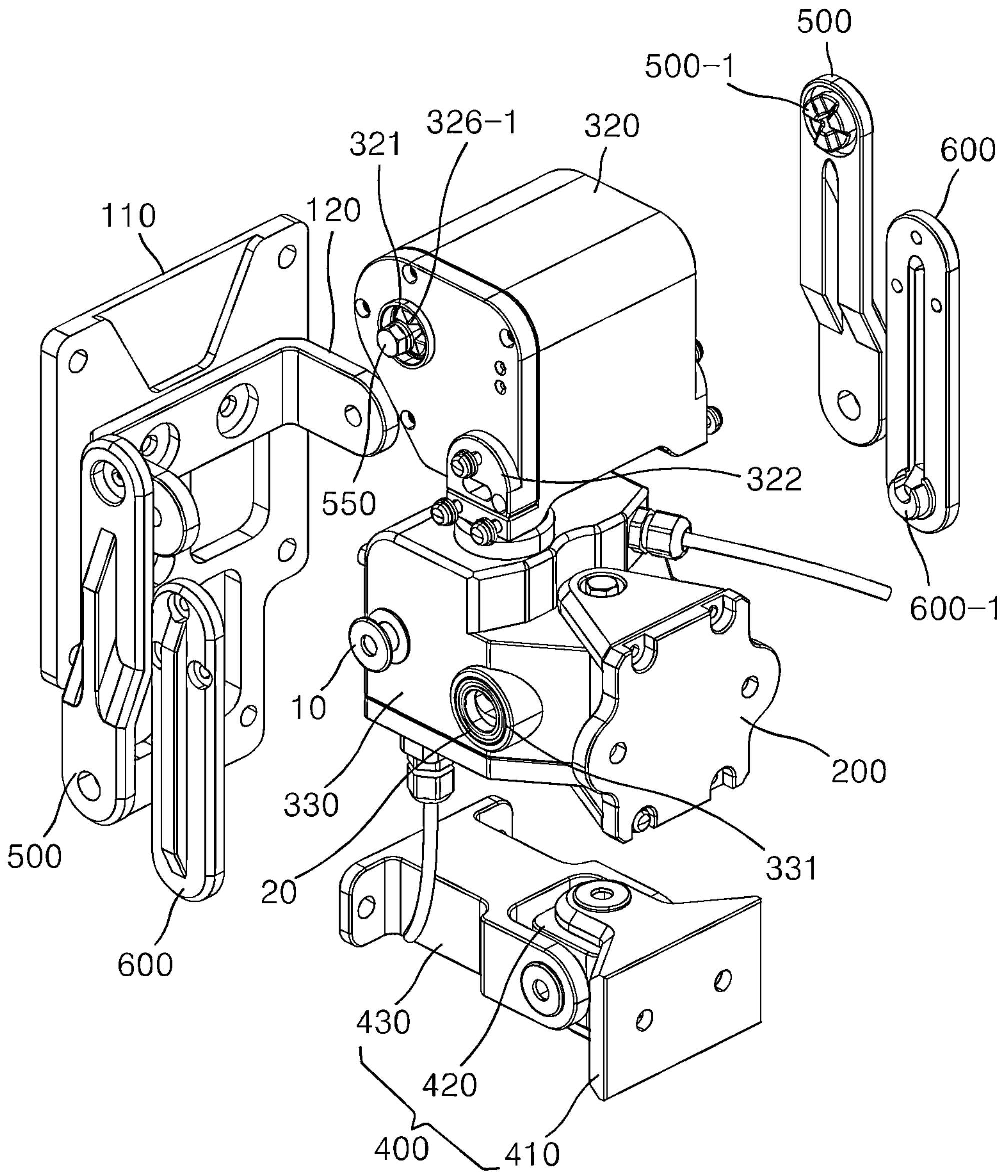

[FIG. 6]
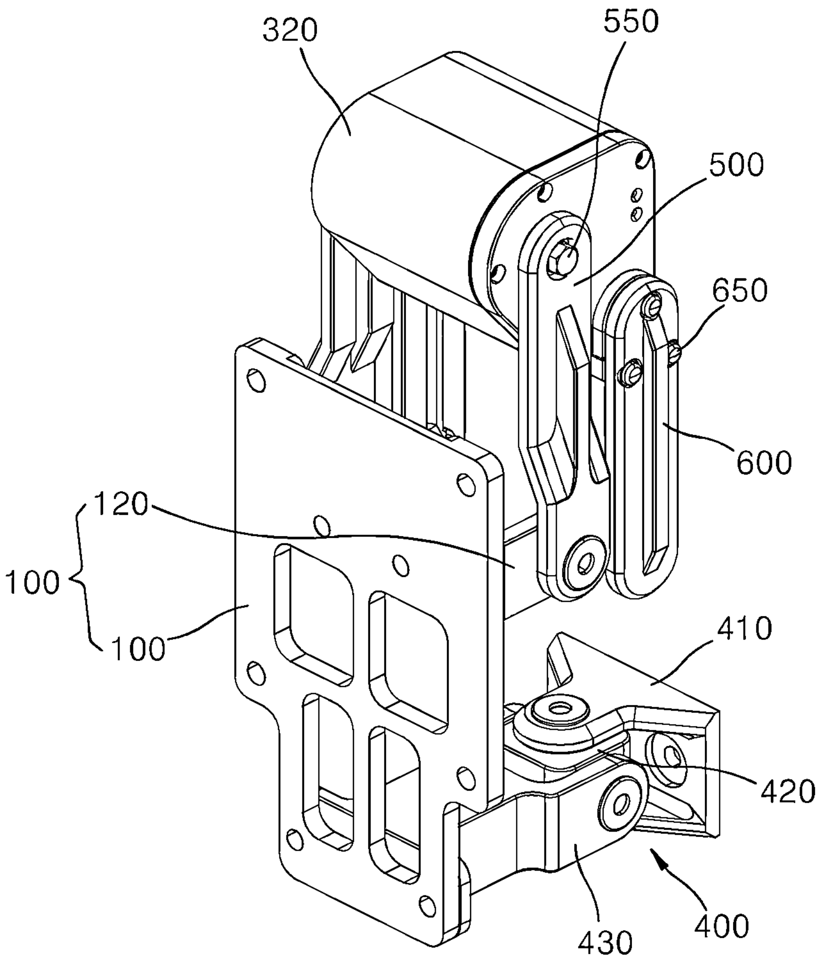

[FIG. 7A]
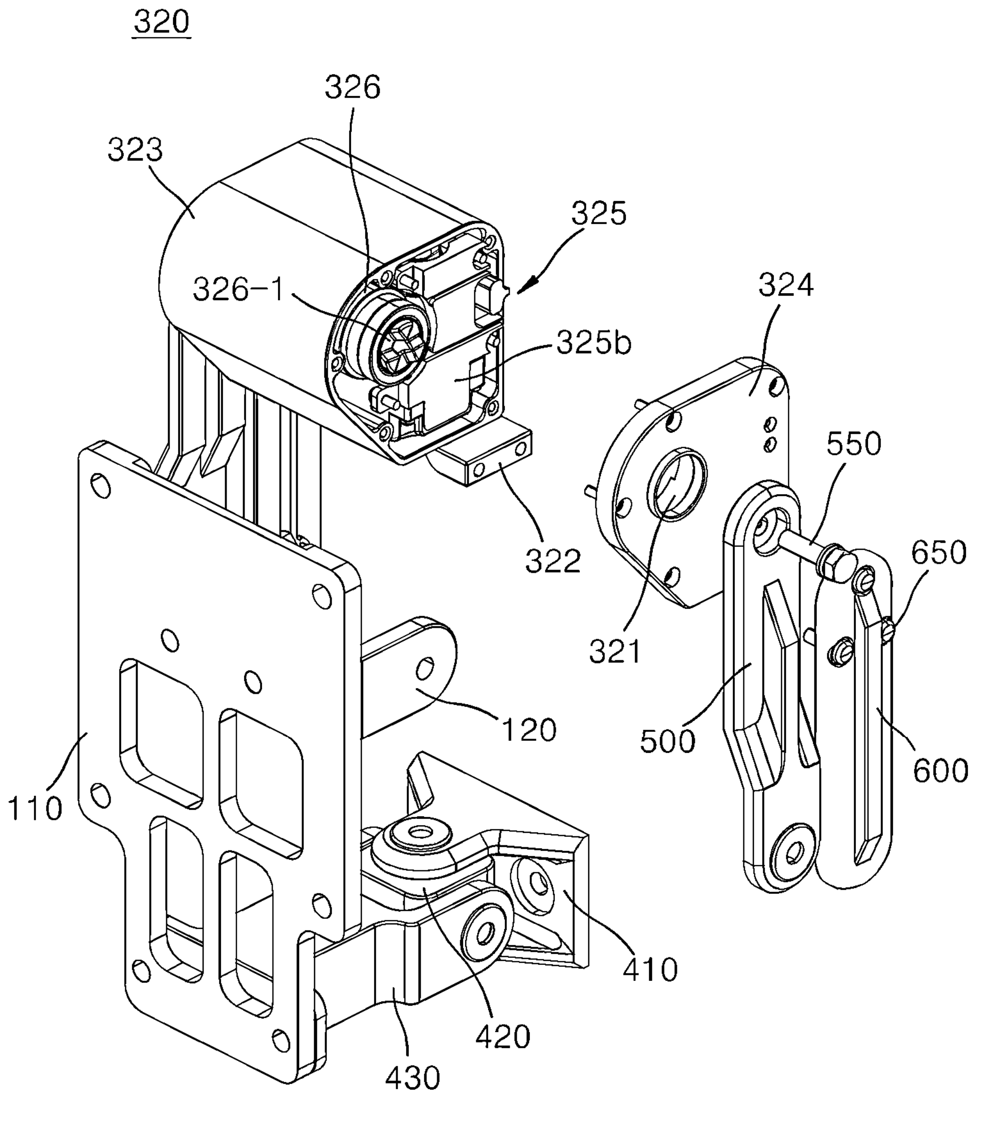

[FIG. 7B]
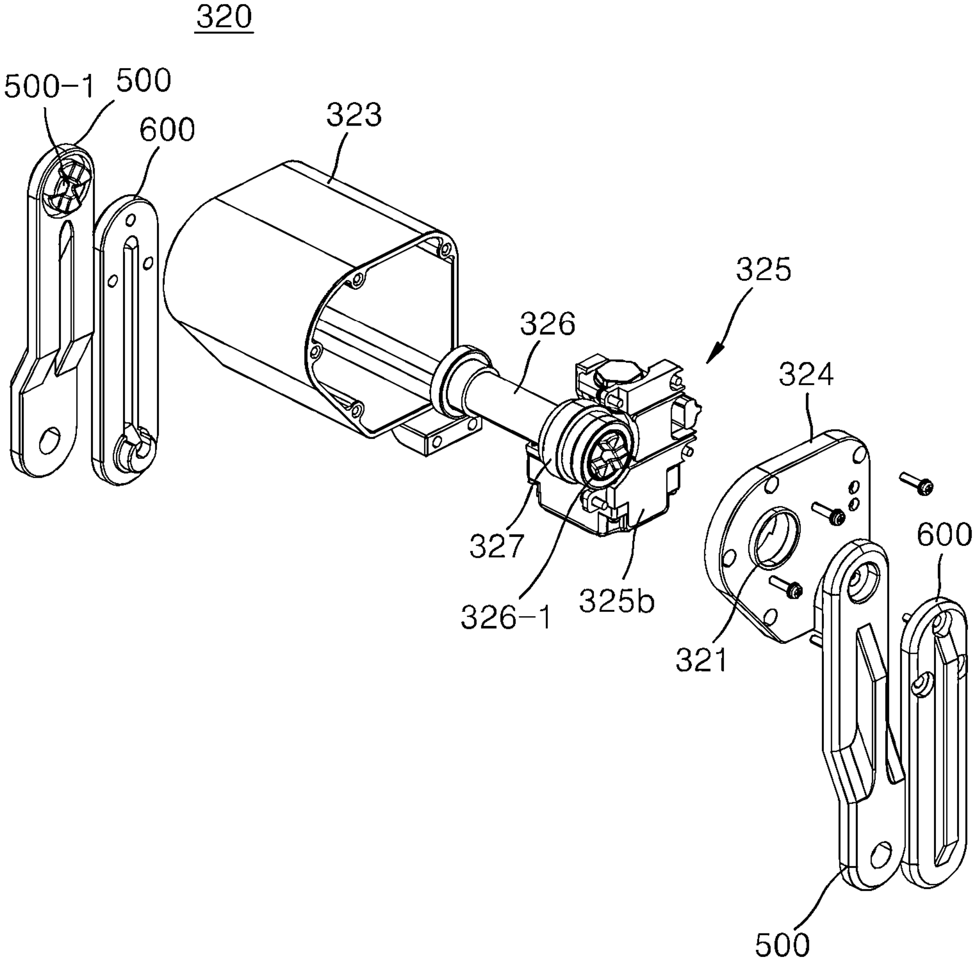

[FIG. 8A]
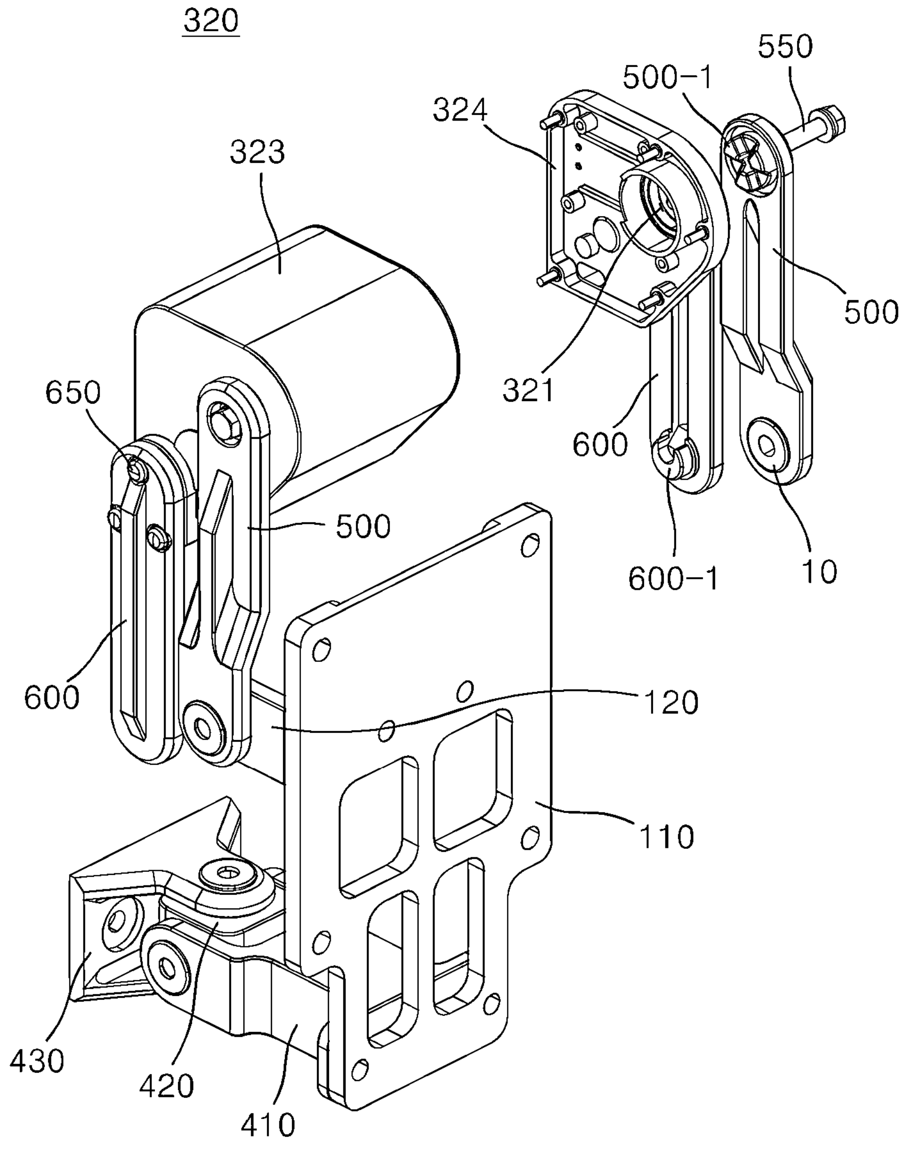

[FIG. 8B]
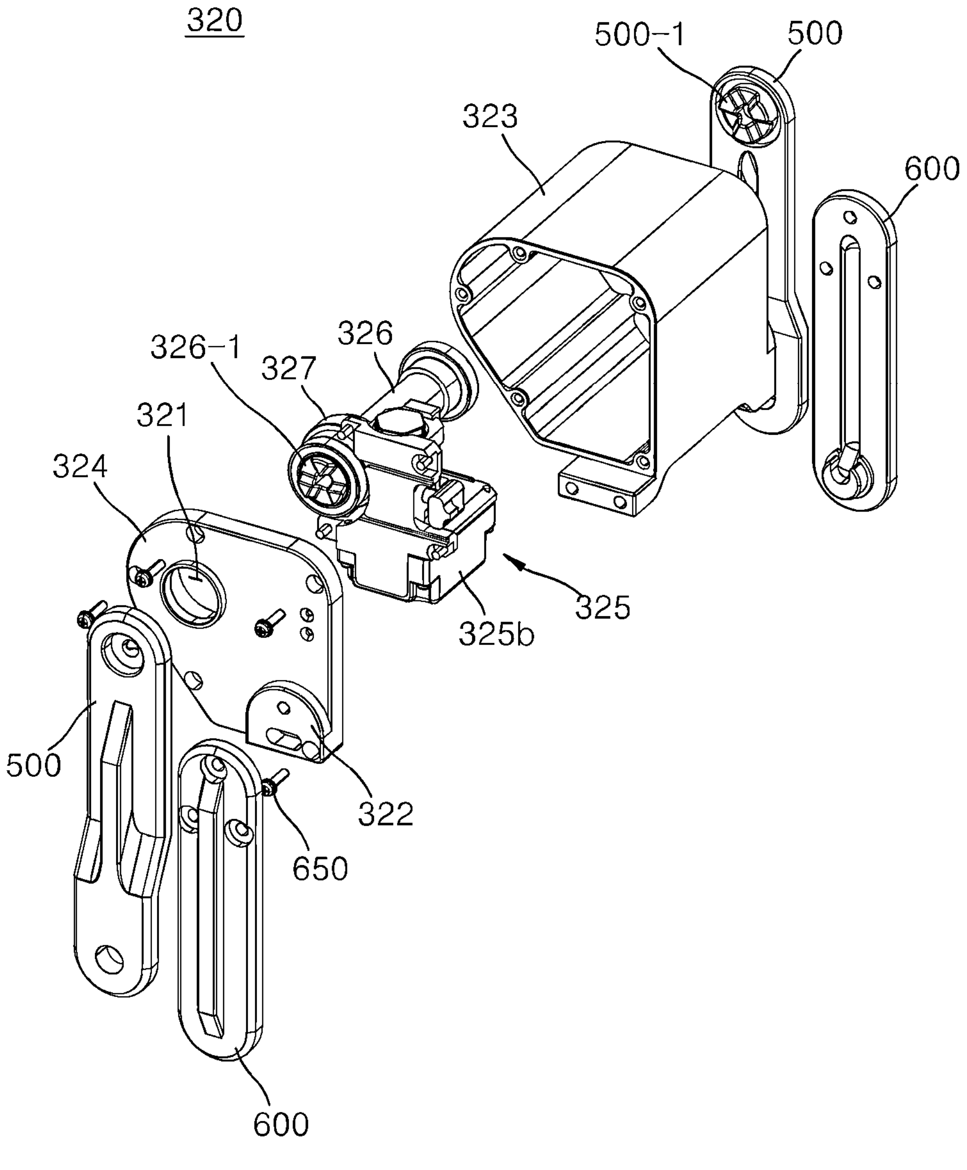

[FIG. 9]
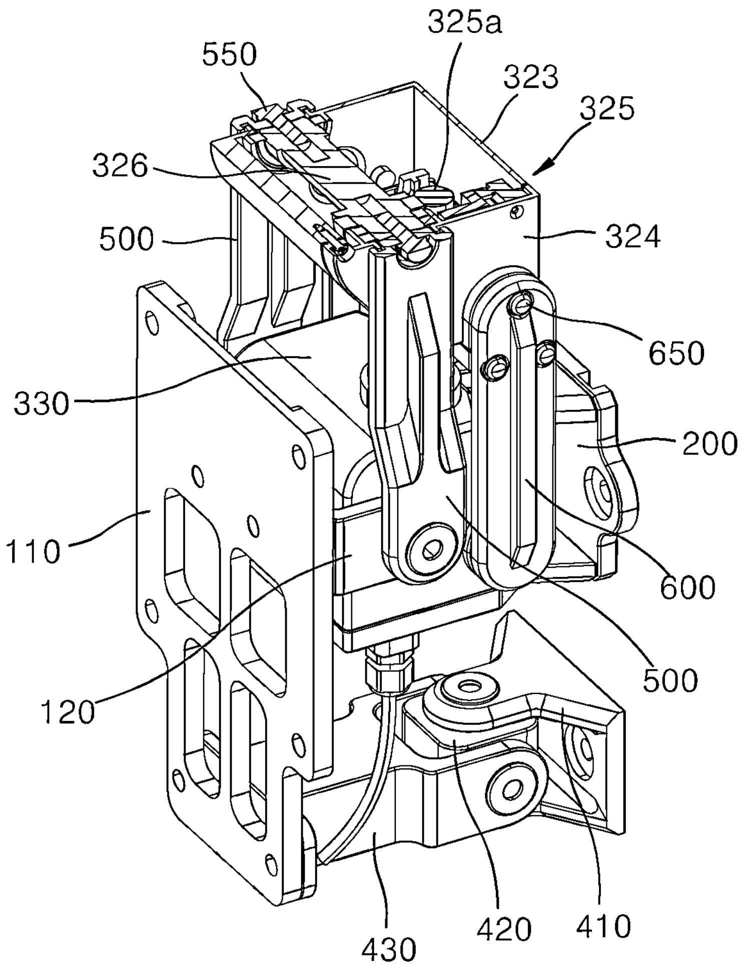

[FIG. 10]
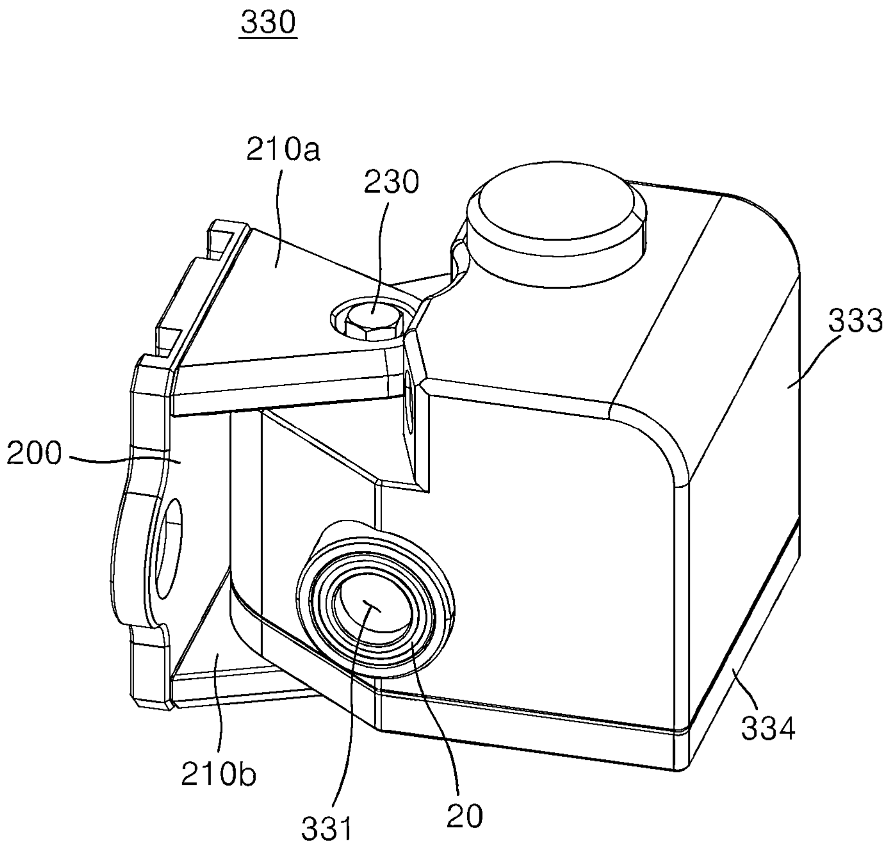

[FIG. 11]
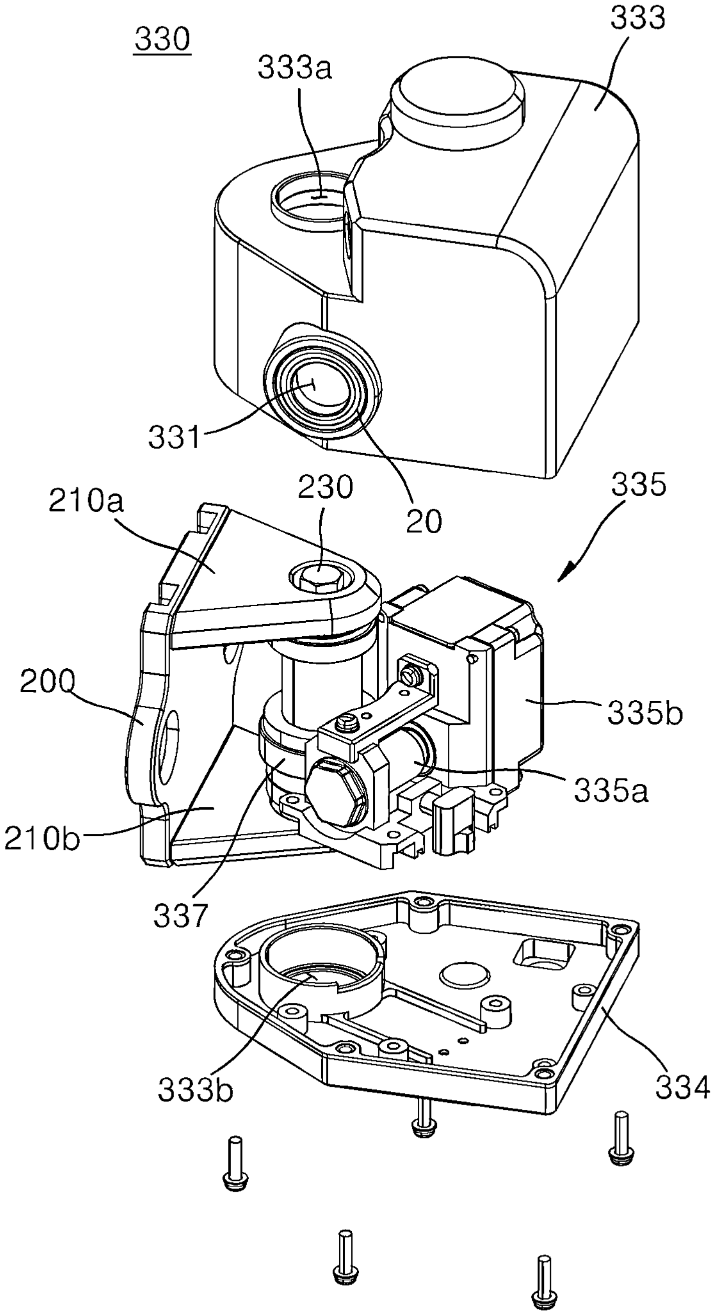

[FIG. 12A]
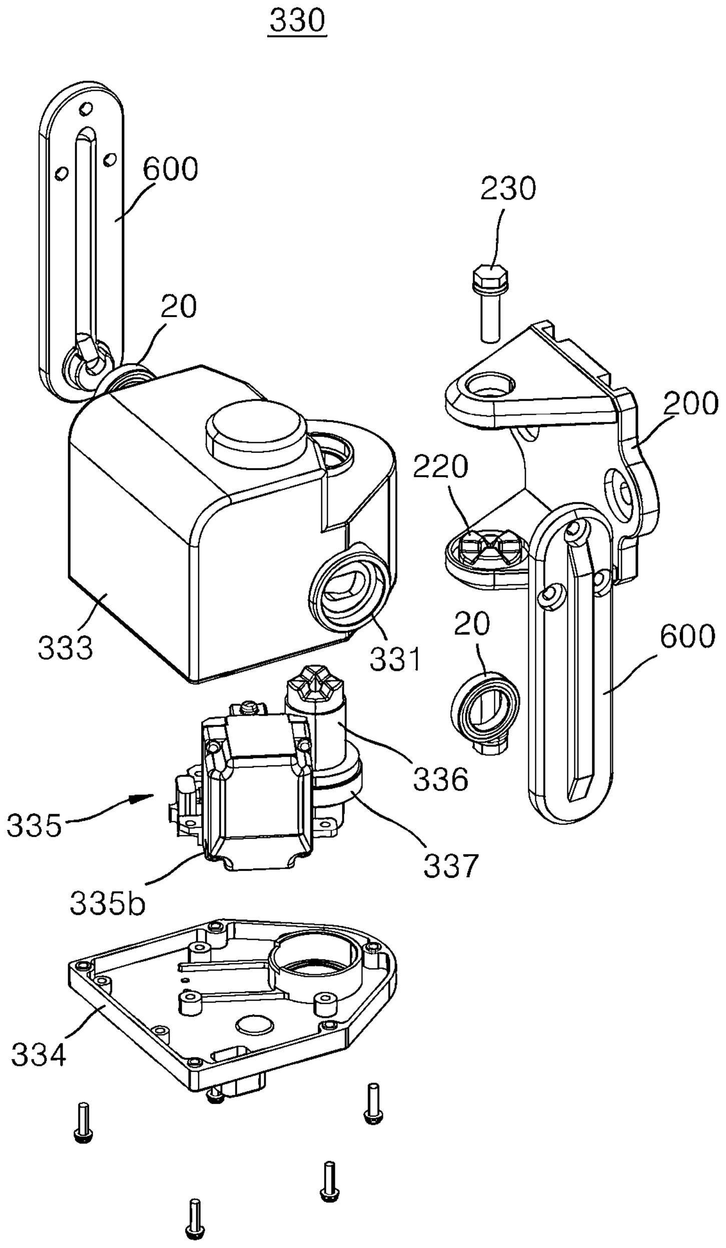

[FIG. 12B]
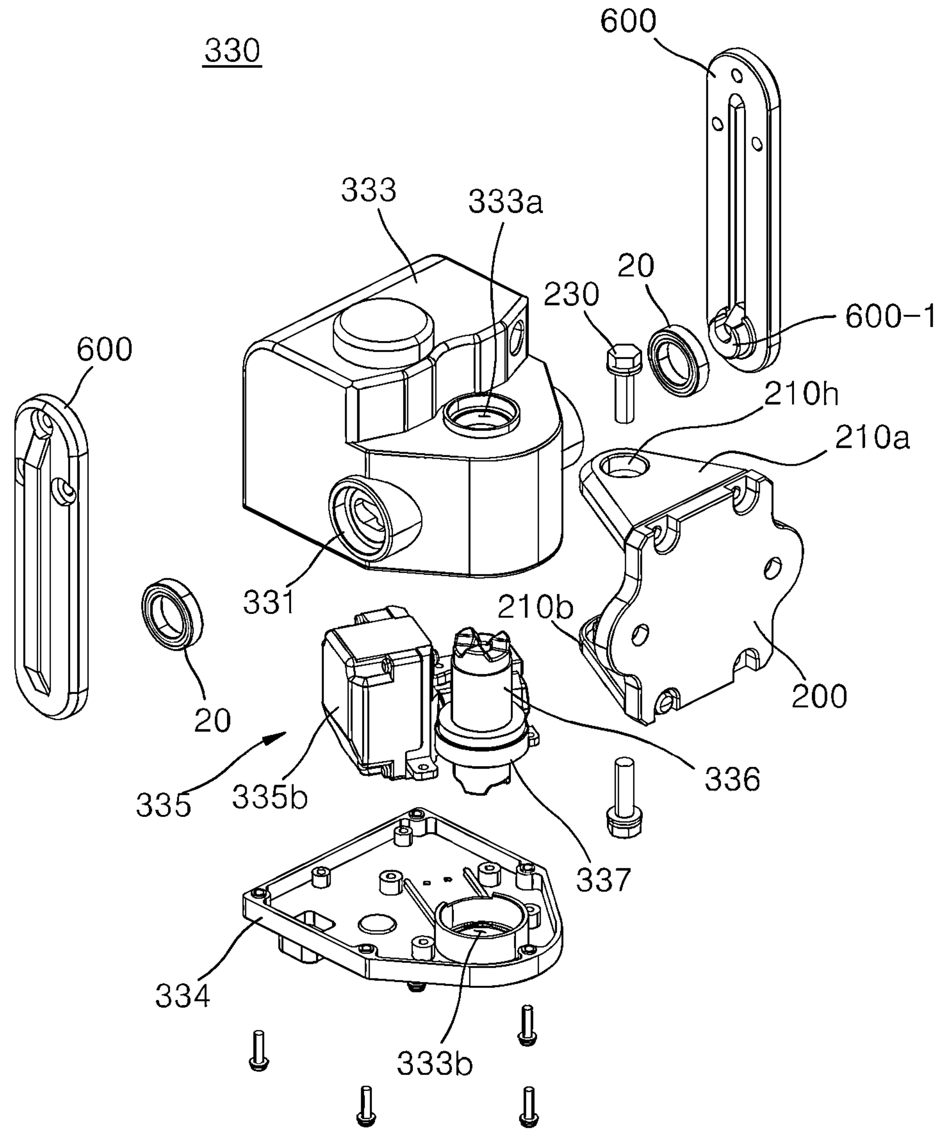

[FIG. 13]
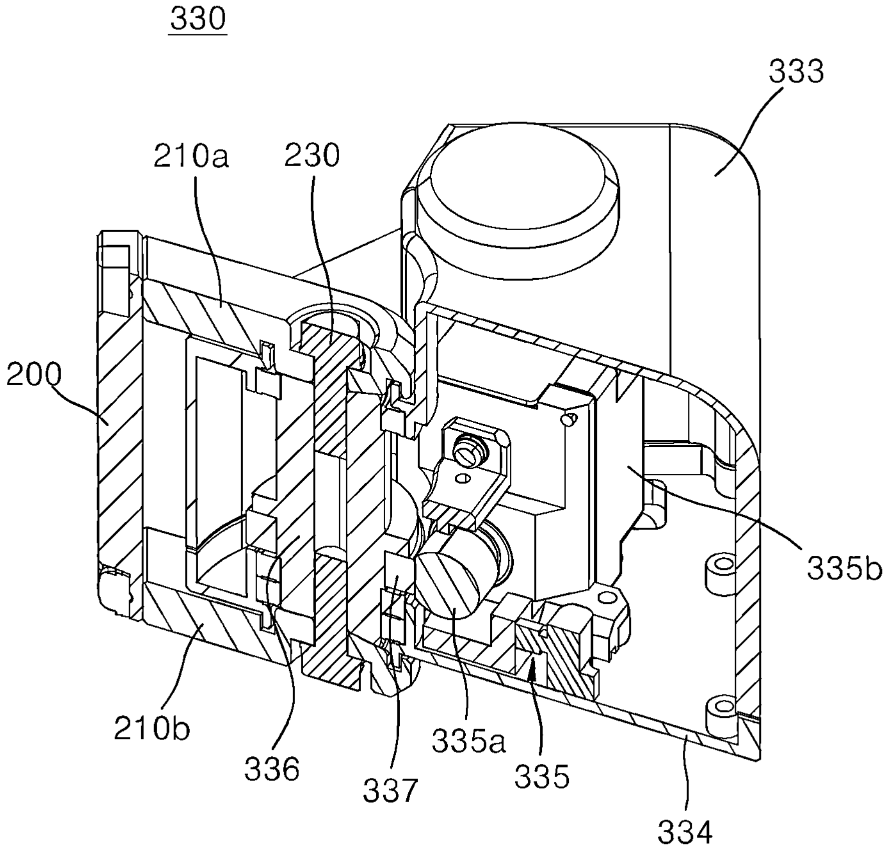

[FIG. 14]
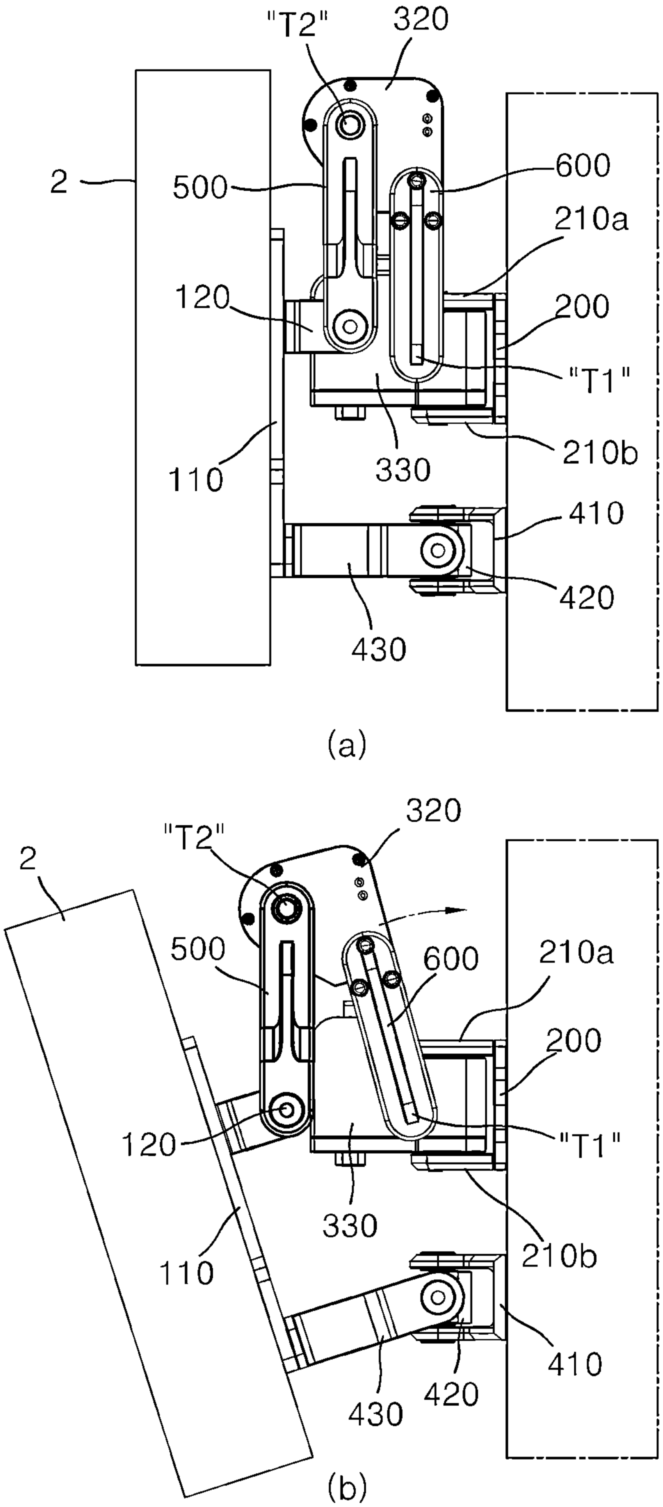
(b)

CLAMPING APPARATUS FOR ANTENNA DEVICE

TECHNICAL FIELD

The present invention relates to a clamping apparatus for an antenna device, and more particularly, to a clamping apparatus for an antenna device, which is capable of efficiently disposing an antenna device in a dense installation space and easily adjusting a direction of the antenna device.

BACKGROUND ART

In general, wireless communication technologies, for example, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about 10 times is ensured by using the same frequency band in comparison with the current single antenna system.

Eight antennas are used in 4G LTE-advanced, and a product equipped with 64 or 128 antennas has been developed in a current pre-5G step. It is expected that base station equipment having a much larger number of antennas will be used in 5G, which refers to a massive MIMO technology. The current cell management is 2-dimension, whereas 3D-beam forming is enabled when the massive MIMO technology is introduced, which also represents a full-dimension (FD) MIMO.

In the massive MIMO technology, the number of transmitters and the number of filters are increased as the number of antennas (ANTs) is increased. Nevertheless, because of cost of lease or spatial restriction in respect to an installation location, RF components (antennas, filters, power amplifiers, transceivers, etc.) need to be practically manufactured to be small in size, light in weight, and inexpensive, and the massive MIMO requires a high output to expand a coverage. However, electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna device installed on a single support pole.

In order to meet the need, Korean Patent No. 10-2095871 (published on Apr. 2, 2020) (hereinafter, referred to as 'the related art') discloses a 'clamping apparatus for an antenna' including a tilting unit configured to rotate an antenna device in an upward/downward direction, and a steering unit configured to rotate the antenna device in a leftward/rightward direction.

However, in the related art, there is a problem in that a range in which the tilting unit rotates the antenna in the upward/downward direction is small.

DISCLOSURE

Technical Problem

An object of the present invention is to provide a clamping apparatus for an antenna device, which is capable of rotating an antenna in an upward/downward direction and a horizontal direction and ensuring a maximum range in which the antenna is rotated in the upward/downward direction.

Technical problems of the present invention are not limited to the aforementioned technical problems, and other technical problems, which are not mentioned above, may be clearly understood by those skilled in the art from the following descriptions.

Technical Solution

In order to achieve the above-mentioned object, the present invention provides a clamping apparatus for an antenna device, the clamping apparatus including: an antenna mounting bracket coupled to a rear surface of an antenna device and configured to support the antenna device; a steering drive unit coupled to be rotatable in a horizontal direction relative to a support pole mounting bracket installed on a support pole; a tilting drive unit movably coupled to the steering drive unit; and at least one tilting link member configured to rotate the tilting drive unit relative to the steering drive unit and move the antenna mounting bracket relative to the tilting drive unit during tilting and steering operations.

In this case, the support pole mounting bracket may include: an upper support pole mounting bracket installed on the support pole and configured such that the steering drive unit is horizontally rotatably coupled to the upper support pole mounting bracket; and a lower support pole mounting bracket installed on the support pole so as to be disposed below the upper support pole mounting bracket and configured to support a lower portion of the antenna mounting bracket so that the lower portion of the antenna mounting bracket is rotatable in an upward/downward direction and rotatable in the horizontal direction.

In addition, the lower support pole mounting bracket may include: a lower support pole mounting main body; a lower steering part coupled to the lower support pole mounting main body so as to be rotatable in the horizontal direction; and a lower tilting part coupled to the lower steering part so as to be rotatable in the upward/downward direction and coupled to the lower portion of the antenna mounting bracket.

In addition, the at least one tilting link member may include: a first tilting link member having one end coupled to an upper portion of the antenna mounting bracket, and the other end rotatably coupled to the tilting drive unit, the first tilting link member being configured to rotate the antenna mounting bracket in an upward/downward direction by driving power of the tilting drive unit; and a second tilting link member having one end coupled to the tilting drive unit, and the other end rotatably coupled to the steering drive unit, the second tilting link member being configured to allow the tilting drive unit to be rotatable in the upward/downward direction relative to the steering drive unit.

In addition, one end of the first tilting link member may be hingedly connected to the upper portion of the antenna mounting bracket so as to be rotatable relative to the upper portion of the antenna mounting bracket, and the other end of the first tilting link member may be coupled and connected to a tilting rotary shaft of the tilting drive unit to rotate one end thereof by receiving driving power from the tilting drive unit.

In addition, one end of the second tilting link member may be fixed to operate in conjunction with the tilting drive unit when the antenna mounting bracket is rotated in the upward/downward direction by the first tilting link member, and the other end of the second tilting link member may be hingedly connected to the steering drive unit so as to be rotatable relative to the steering drive unit.

In addition, the tilting drive unit may include: a tilting housing; a tilting speed reducer disposed in the tilting housing and having a tilting worm gear; and a tilting rotary shaft disposed in the tilting housing and having an outer peripheral surface on which a tilting worm wheel gear, which engages with the tilting worm gear, is provided, the tilting rotary shaft being disposed horizontally and coupled to the other end of the first tilting link member.

In addition, a tilting shaft matching part having a concave-convex shape may be provided at an outer end of the tilting rotary shaft, a link matching part, which is matched with the tilting shaft matching part, may be provided at the other end of the first tilting link member, and the other end of the first tilting link member may be coupled by means of a link fastening bolt in a state in which the link matching part is matched with the tilting shaft matching part.

The antenna mounting bracket may include: an antenna mounting bracket body coupled to a rear surface of the antenna device; and an antenna mounting bracket wing protruding from the antenna mounting bracket body toward the support pole and hingedly coupled to one end of the first tilting link member by means of a fixing member.

In addition, the fixing member may be provided as a hinge bearing type configured to support a rotation between one end of the first tilting link member and the antenna mounting bracket wing.

In addition, the antenna mounting bracket wing may be provided as a pair of antenna mounting bracket wings spaced apart from each other in the horizontal direction, the first tilting link member may be provided as a pair of first tilting link members each having one end coupled to each of the pair of antenna mounting bracket wings, and the pair of first tilting link members may have the other ends rotatably and hingedly coupled to two opposite left and right sides of the tilting drive unit, respectively.

In addition, the second tilting link member may be provided as a pair of second tilting link members each having one end coupled to each of two opposite sides of the tilting drive unit, and the pair of second tilting link members may have the other ends rotatably and hingedly coupled to two opposite left and right sides of the steering drive unit, respectively.

In addition, the other end of the second tilting link member may be coupled to the steering drive unit by means of a roller bearing.

In addition, the steering drive unit may include: a steering housing; a steering speed reducer disposed in the steering housing and having a steering worm gear; and a steering rotary shaft disposed in the steering housing and having an outer peripheral surface on which a steering worm wheel gear, which engages with the steering worm gear, is provided, the steering rotary shaft being disposed vertically and coupled to the upper support pole mounting bracket.

In addition, a rotary shaft of the steering worm gear may be horizontally disposed to be inclined leftward or rightward in the steering housing.

Other detailed matters of the embodiment are included in the detailed description and the drawings.

Advantageous Effects

The clamping apparatus for an antenna device according to the present invention may ensure a maximum tilting adjustment range of the antenna device by means of the first tilting link members and the second tilting link members.

The effects of the present invention are not limited to the aforementioned effects, and other effects, which are not mentioned above, will be clearly understood by those skilled in the art from the claims.

DESCRIPTION OF DRAWINGS

FIG. 1 is a perspective view illustrating a state in which an antenna device is tilted in a state in which the antenna device is installed on a support pole.

FIG. 2 is a front perspective view illustrating a clamping apparatus for an antenna device illustrated in FIG. 1.

FIG. 3 is a rear perspective view illustrating the clamping apparatus for an antenna device illustrated in FIG. 1.

FIG. 4 is an exploded perspective view illustrating the clamping apparatus for an antenna device illustrated in FIG. 2.

FIG. 5 is an exploded perspective view illustrating the clamping apparatus for an antenna device illustrated in FIG. 3.

FIG. 6 is a perspective view of a tilting drive unit in a state in which a steering drive unit illustrated in FIG. 4 is excluded.

FIG. 7A is an exploded perspective view when FIG. 6 is viewed in one direction, i.e., an exploded perspective view illustrating a state in which a tilting link member is separated.

FIG. 7B is an exploded perspective view illustrating a front side in FIG. 6, i.e., an exploded perspective view illustrating a state in which an internal configuration is exposed.

FIG. 8A is an exploded perspective view when FIG. 6 is viewed in the other direction, i.e., an exploded perspective view illustrating a state in which the tilting link member is separated.

FIG. 8B is an exploded perspective view illustrating a rear side in FIG. 6, i.e., an exploded perspective view illustrating a state in which the internal configuration is exposed.

FIG. 9 is a cut-away perspective view illustrating an interior of the tilting drive unit.

FIG. 10 is a perspective view of the steering drive unit illustrated in FIG. 4.

FIG. 11 is an exploded perspective view illustrating power transmission to the steering drive unit illustrated in FIG. 10.

FIG. 12A is an exploded perspective view of the steering drive unit illustrated in FIG. 4.

FIG. 12B is an exploded perspective view of the steering drive unit illustrated in FIG. 5.

FIG. 13 is a cut-away perspective view illustrating an interior of the steering drive unit.

FIG. 14 is a side view illustrating states made before and after the clamping apparatus for an antenna device according to the embodiment of the present invention is tilted.

EXPLANATION OF REFERENCE NUMERALS AND SYMBOLS

1: Clamping apparatus for antenna
2: Antenna device
3: Support pole
10: Fixing member
20: Roller bearing
100: Antenna mounting bracket
110: Antenna mounting bracket body
120: Antenna mounting bracket wing
200: Upper support pole mounting bracket
210*a*: Upper mounting
220: Mounting matching part
230: Shaft fixing bolt
320: Tilting drive unit
321: Hole
322: Coupling part
323: Tilting housing main body
324: Tilting housing cover
325: Tilting speed reducer
326: Tilting rotary shaft
327: Tilting worm wheel gear
330: Steering drive unit
331: Hole
333: Steering housing main body
334: Steering housing cover
335: Steering speed reducer
336: Steering rotary shaft
337: Steering worm wheel gear
400: Lower support pole mounting bracket
500: First tilting link member
600: Second tilting link member

BEST MODE

Hereinafter, a clamping apparatus for an antenna device according to an embodiment of the present invention will be described with reference to the drawings.

FIG. 1 is a perspective view illustrating a state in which an antenna device is tilted in a state in which the antenna device is installed on a support pole, FIG. 2 is a front perspective view illustrating a clamping apparatus for an antenna device illustrated in FIG. 1, and FIG. 3 is a rear perspective view illustrating the clamping apparatus for an antenna device illustrated in FIG. 1.

Hereinafter, in the embodiment described with reference to FIGS. 1 to 3, an example will be described in which the clamping apparatus of the present invention is applied to an antenna device. However, the clamping apparatus of the present invention may be applied not only to a case in which the antenna device is installed on the support pole but also to a case in which a lighting device (not illustrated), such as an LED lighting device or a high-output sport lighting, is installed on a support pole.

With reference to FIGS. 1 to 3, a clamping apparatus 1 for an antenna device according to an embodiment of the present invention may be an apparatus for installing an antenna device 2 on a support pole 3. In a state in which the antenna device 2 is installed on the support pole 3 by means of the clamping apparatus 1 for an antenna device, the clamping apparatus 1 for an antenna device may adjust a direction of the antenna device 2 by rotating the antenna device 2 in an upward/downward direction and a leftward/rightward direction.

The antenna device 2 may include an approximately hexahedral antenna housing (no reference numeral). A printed circuit board, on which at least one antenna element and at least one radio signal processing part (radio unit (RU)) are mounted, may be provided in the antenna housing.

In this case, the antenna element may transmit or receive radio signals, and the radio signal processing part may process the radio signals. In addition, the antenna housing may, of course, be made of a heat dissipation material such as aluminum. Heat dissipation ribs may be formed on an outer surface of the antenna housing to increase contact areas with ambient air.

The support pole 3 may be configured as an RC bar. Of course, the support pole 3 is not limited to the RC bar. Examples of the support pole 3 may include all column-shaped members having outer peripheral surfaces on which the antenna device 2 is installed by means of the clamping apparatus 1 for an antenna.

The clamping apparatus 1 for an antenna device according to the embodiment of the present invention may include an antenna mounting bracket 100, support pole mounting brackets 200 and 400, a tilting drive unit 320, a steering drive unit 330, and one or more tilting link members 500 and 600.

The antenna mounting bracket 100 may be mounted on a rear surface of the antenna device 2 and support the antenna device 2.

In this case, the support pole mounting brackets 200 and 400 include an upper support pole mounting bracket 200 and a lower support pole mounting bracket 400. The upper support pole mounting bracket 200 and the lower support pole mounting bracket 400 may be disposed on a straight line and spaced apart from each other in a longitudinal direction of the support pole 3.

More specifically, the upper support pole mounting bracket 200 may be installed on the support pole 3 and disposed relatively above the lower support pole mounting bracket 400. The upper support pole mounting bracket 200 may be coupled to a rear portion of the steering drive unit 330, and the steering drive unit 330 may be supported on the upper support pole mounting bracket 200 so as to be rotatable in a horizontal direction.

The lower support pole mounting bracket 400 may be disposed relatively below the upper support pole mounting bracket 200 and installed on the support pole 3. The lower support pole mounting bracket 400 may support a lower portion of the antenna mounting bracket 100 so that the lower portion of the antenna mounting bracket 100 is rotatable in the upward/downward direction and the horizontal direction.

FIG. 4 is an exploded perspective view illustrating the clamping apparatus for an antenna device illustrated in FIG. 2, FIG. 5 is an exploded perspective view illustrating the clamping apparatus for an antenna device illustrated in FIG. 3, FIG. 6 is a perspective view of a tilting drive unit in a state in which the steering drive unit illustrated in FIG. 4 is excluded, FIG. 7A is an exploded perspective view when FIG. 6 is viewed in one direction, i.e., an exploded perspective view illustrating a state in which the tilting link member is separated, FIG. 7B is an exploded perspective view illustrating a front side in FIG. 6, i.e., an exploded perspective view illustrating a state in which an internal configuration is exposed, FIG. 8A is an exploded perspective view when FIG. 6 is viewed in the other direction, i.e., an exploded perspective view illustrating a state in which the tilting link member is separated, FIG. 8B is an exploded perspective view illustrating a rear side in FIG. 6, i.e., an exploded perspective view illustrating a state in which the internal configuration is exposed, and FIG. 9 is a cut-away perspective view illustrating an interior of the tilting drive unit.

As illustrated in FIGS. 4 to 9, the tilting drive unit 320 may generate driving power for tilting the antenna device 2 in the upward/downward direction.

The tilting drive unit 320 may be coupled to the upper support pole mounting bracket 200 so as to be rotatable in the horizontal direction and installed to move integrally with the steering drive unit 330 that is rotated in the horizontal direction by the driving power of the tilting drive unit 320.

In this case, as illustrated in FIGS. 4 to 9, one or more tilting link members 500 and 600 may include first tilting link members 500 substantially related to the tilting operation of the antenna device 2, and second tilting link members 600 configured to connect the tilting drive unit 320 and the steering drive unit 330.

One end of the first tilting link member 500 may be coupled to an upper portion of the antenna mounting bracket 100, and the other end of the first tilting link member 500 may be rotatably coupled to the tilting drive unit 320, such that the first tilting link member 500 may rotate the antenna mounting bracket 100 in the upward/downward direction by means of the driving power of the tilting drive unit 320.

More specifically, one end of the first tilting link member 500 may be hingedly connected to the upper portion of the antenna mounting bracket 100 so as to be rotatable relative to the upper portion of the antenna mounting bracket 100, and the other end of the first tilting link member 500 may be coupled and connected to a tilting rotary shaft 326 of the tilting drive unit 320, such that the first tilting link member 500 may rotate one end of the tilting drive unit 320 by receiving the driving power from the tilting drive unit 320.

In particular, as illustrated in FIG. 7B, a tilting shaft matching part 326-1 having a concave-convex shape may be provided at an outer end of the tilting rotary shaft 326, and a link matching part 500-1 may be provided at the other end of the first tilting link member 500 and matched with the tilting shaft matching part 326-1. In case that the link matching part 500-1 comes into surface contact and is matched with the tilting shaft matching part 326-1, the link matching part 500-1 interferes with the tilting shaft matching part 326-1 in a rotation direction of the first tilting link member 500, such that the first tilting link member 500 may receive a rotational force of the tilting rotary shaft 326.

In this case, the other end of the first tilting link member 500 may be coupled by means of a link fastening bolt 550 in the state in which the link matching part 500-1 is matched with the tilting shaft matching part 326-1.

One end of the second tilting link member 600 may be coupled to the tilting drive unit 320, and the other end of the second tilting link member 600 may be rotatably coupled to the steering drive unit 330, such that the second tilting link member 600 may rotate the tilting drive unit 320 in the upward/downward direction relative to the steering drive unit 330.

More specifically, one end of the second tilting link member 600 may be fixed to operate in conjunction with the tilting drive unit 320 when the antenna mounting bracket 100 is rotated in the upward/downward direction by the first tilting link member 500. The other end of the second tilting link member 600 may be hingedly connected to the steering drive unit 330 so as to be rotatable relative to the steering drive unit 330.

In particular, as illustrated in FIG. 4, the other end of the second tilting link member 600 may be coupled to the steering drive unit 330 by means of a roller bearing 20.

The roller bearing 20 may include an outer race fixed in a hole 331 of a steering housing main body 333 of the steering drive unit 330 that will be described below, an inner race positioned in the outer race and configured such that a coupling end 600-1 of the second tilting link member 600 is inserted into the inner race, and a plurality of ball bearings disposed between the outer race and the inner race.

In the state in which the coupling end 600-1 is inserted into the inner race of the roller bearing 20, the second tilting link member 600 may be hingedly coupled to the steering housing main body 333 by using a non-illustrated link fastening bolt.

FIG. 10 is a perspective view of the steering drive unit illustrated in FIG. 4, FIG. 11 is an exploded perspective view illustrating power transmission to the steering drive unit illustrated in FIG. 10, FIG. 12A is an exploded perspective view of the steering drive unit illustrated in FIG. 4, FIG. 12B is an exploded perspective view of the steering drive unit illustrated in FIG. 5, and FIG. 13 is a cut-away perspective view illustrating an interior of the steering drive unit.

As illustrated in FIGS. 4 and 5, the antenna mounting bracket 100 may include an antenna mounting bracket body 110 coupled to the rear surface of the antenna device 2, and antenna mounting bracket wings 120 protruding from the antenna mounting bracket body 110 toward the support pole 3 and each coupled to one end of the first tilting link member 500 by means of a fixing member 10.

The antenna mounting bracket wings 120 may be provided as a pair of antenna mounting bracket wings 120 provided on a rear surface of the antenna mounting bracket body 110 and spaced apart from each other in the horizontal direction. The first tilting link members 500 may be provided as a pair of first tilting link members 500 each connected to one end of each of the pair of antenna mounting bracket wings 120. The other ends of the pair of first tilting link members 500 may be respectively rotatably and hingedly coupled to two opposite left and right sides of the tilting drive unit 320.

In this case, the fixing member 10 may be provided as a hinge bearing type member configured to support the rotation between one end of the first tilting link member 500 and the antenna mounting bracket wing 120.

As described above, the antenna mounting bracket 100 may be provided to be freely rotatable by the hingedly connected fixing member 10, such that an upper end of the antenna mounting bracket 100 may be tilted in the upward/downward direction about a lower end of the antenna mounting bracket 100 along a swing trajectory of one end of the first tilting link member 500.

In addition, the second tilting link members 600 may be provided as a pair of second tilting link members 600 each having one end coupled to each of the two opposite sides of the tilting drive unit 320. The other ends of the pair of second tilting link members 600 may be respectively rotatably and hingedly coupled to two opposite left and right sides of the steering drive unit 330 by means of the roller bearings 20.

Even in this case, the other end of the second tilting link member 600 may be provided to be freely rotatable relative to the steering drive unit 330 by the roller bearing 20. Therefore, when the first tilting link member 500 is tilted by driving power transmitted from the tilting drive unit 320, the tilting drive unit 320 may move, separately from the steering drive unit 330, along a swing trajectory of the other end of the second tilting link member 600, such that a tiltable range of the antenna device 2 may be expanded within a movable range of the tilting drive unit 320.

More specifically, as illustrated in FIGS. 2 and 3, the tilting drive unit 320 may be disposed above the steering drive unit 330 in a state in which the tilting drive unit 320 is maximally rotated upward. As illustrated in FIG. 1, the tilting drive unit 320 may be disposed below the steering drive unit 330 in a state in which the tilting drive unit 320 is maximally rotated downward. Therefore, it is possible to ensure a maximum tilting adjustment range of the antenna device 2.

However, the tilting drive unit 320 does not necessarily need to be moved to be disposed below the steering drive unit 330. As illustrated in FIG. 14 described below, the tilting drive unit 320 may, of course, be positioned to be higher than the steering drive unit 330 within a range in which the maximum tilting angle of the antenna device 2 is ensured.

The lower support pole mounting bracket 400 may include a lower support pole mounting main body 410, a lower steering part 420 coupled to the lower support pole mounting main body 410 so as to be rotatable in the horizontal direction, and a lower tilting part 430 coupled to the lower steering part 420 so as to be rotatable in the upward/downward direction and coupled to a lower portion of the antenna mounting bracket 100.

Specifically, the antenna mounting bracket 100 may be installed on the antenna device 2. The antenna mounting bracket 100 may be installed on the rear surface of the antenna device 2. The antenna mounting bracket 100 may be connected to the antenna device 2 and support the antenna device 2. In the state in which the antenna mounting bracket 100 is installed on the rear surface of the antenna device 2, the antenna mounting bracket 100 may protrude toward the support pole 3.

The antenna mounting bracket 100 may include the antenna mounting bracket body 110 and the antenna mounting bracket wing 120.

The antenna mounting bracket body 110 may be coupled to the rear surface of the antenna device 2. The antenna mounting bracket body 110 may be formed in a plate shape having a front surface being in contact with the rear surface of the antenna device 2.

The antenna mounting bracket body 110 may be coupled to the rear surface of the antenna device 2 by means of a plurality of bolts and a plurality of nuts. In this case, bolt holes, to which the bolts are fastened, may be formed in the antenna mounting bracket body 110 and the rear surface of the antenna device 2.

Of course, the antenna mounting bracket body 110 may be coupled to the rear surface of the antenna device 2 by various publicly-known coupling methods such as welding.

The antenna mounting bracket wings 120 may be provided as the pair of antenna mounting bracket wings 120 protruding rearward from the rear surface of the antenna mounting bracket body 110 and spaced apart from each other in the horizontal direction. The antenna mounting bracket wing 120 may be formed in a quadrangular plate shape, and a rear end of the antenna mounting bracket wing 120 may be formed in a convexly rounded shape. The antenna mounting bracket wing 120 may be fixedly coupled to one end of the first tilting link member 500, such that the antenna mounting bracket wing 120 may rotate in the upward/downward direction when the first tilting link member 500 is rotated in the upward/downward direction by the driving power of the tilting drive unit 320.

With reference to FIGS. 4 to 9, the tilting drive unit 320 may include tilting housings 323 and 324, a tilting speed reducer 325 disposed in the tilting housings 323 and 324 and having a tilting worm gear 325*a*, and the tilting rotary shaft 326 disposed in the tilting housings 323 and 324 and having an outer peripheral surface on which a tilting worm wheel gear 327, which engages with the tilting worm gear 325*a*, is provided, the tilting rotary shaft 326 being disposed horizontally and coupled to the other end of the first tilting link member 500.

Holes 321 may be formed at two opposite sides of the tilting housings 323 and 324, and the other ends of the first tilting link members 500 may be rotatably coupled to the holes 321. Coupling parts 322 may protrude from the two opposite sides of the tilting housings 323 and 324, and one end of each of the second tilting link members 600 may be coupled to the coupling part 322.

Specifically, the tilting housings 323 and 324 may include a tilting housing main body 323 having an empty interior and opened at one side thereof, and a tilting housing cover 324 coupled to block one open side of the tilting housing main body 323.

In this case, the hole 321, to which the other end of the first tilting link member 500 is coupled, and the coupling part 322, to which one end of the second tilting link member 600 is coupled, may penetrate a left closed portion of the tilting housing main body 323 and the tilting housing cover 324 or be formed on an outer surface of the left closed portion of the tilting housing main body 323 and an outer surface of the tilting housing cover 324.

In particular, one end of the second tilting link member 600 may be in surface contact with and fixed to the coupling part 322 by means of a plurality of assembling screws 650. Therefore, when the first tilting link member 500 is rotated by tilting driving power, the tilting drive unit 320 moves in a forward/rearward direction about the other end of the second tilting link member 600.

With reference to FIGS. 4 and 10 to 13, the steering drive unit 330 may include steering housings 333 and 334, a steering speed reducer 335 disposed in the steering housings 333 and 334 and having a steering worm gear 335*a*, and a steering rotary shaft 336 disposed in the steering housings 333 and 334 and having an outer peripheral surface on which a steering worm wheel gear 337, which engages with the steering worm gear 335*a*, is provided, the steering rotary shaft 336 being disposed vertically and coupled to the upper support pole mounting bracket 200.

Specifically, the steering housings 333 and 334 may include a steering housing main body 333 having an empty interior and opened at a lower side thereof, and a steering housing cover 334 coupled to block the open lower side of the steering housing main body 333.

In this case, as illustrated in FIGS. 12A and 12B, a rear end of the steering housing main body 333 is installed to be inserted between an upper mounting panel part 210*a* and a lower mounting panel part 210*b* protruding forward from the upper support pole mounting bracket 200. The steering rotary shaft 336 may be fixed by bolting by using a shaft fixing bolt 230 through shaft fixing holes 210*h* respectively formed through the upper mounting panel part 210*a* and the lower mounting panel part 210*b* in the upward/downward direction.

The steering rotary shaft 336 is disposed vertically in the upward/downward direction in the steering housing main body 333 and axially rotates by receiving driving power thereof transmitted from the steering speed reducer 335. The steering rotary shaft 336 may be fixed by bolting by means of the shaft fixing bolt 230 in a state in which an upper-end surface and a lower-end surface thereof are respectively matched with mounting matching parts 220 formed in concave-convex shapes on a lower surface of the upper mounting panel part 210*a* and an upper surface of the lower mounting panel part 210*b*.

The upper-end surface and the lower-end surface of the steering rotary shaft 336 are respectively matched with the mounting matching parts 220 and interfere with the mounting matching parts 220 in the axial rotation direction, such that the steering drive unit 330 is steered in the leftward/rightward direction by the rotational force of the steering rotary shaft 336.

In this case, the upper and lower ends of the steering rotary shaft 336 may be respectively exposed upward and downward through an upper through-hole 333*a* and a lower through-hole 333*b* formed upward and downward through a rear end of the steering housing main body 333, and the upper and lower ends of the steering rotary shaft 336 may be matched with the mounting matching part 220 of the upper mounting panel part 210*a* and the mounting matching part 220 of the lower mounting panel part 210*b*.

Meanwhile, the steering speed reducer 335 may include a reduction gear box 335*b* embedded with a reduction motor (not illustrated) and a gear set (not illustrated), and the steering worm gear 335*a* configured to rotate by receiving driving power outputted from the reduction gear box 335*b*.

In this case, in order to minimize an increase in volume of a rear portion with a relatively small volume, the steering worm gear 335*a* may be disposed horizontally to be inclined leftward or rightward in the steering housings 333 and 334.

The holes 331 may be formed at the two opposite sides of the steering housings 333 and 334, and the other ends of the second tilting link members 600 may be rotatably coupled to the holes 331. The roller bearings 20 may be mounted in the holes 331 at the two opposite sides, and the other ends of the second tilting link members 600 are freely rotatably coupled to the roller bearings 20.

FIG. 14 is a side view illustrating states made before and after the clamping apparatus for an antenna device according to the embodiment of the present invention is tilted.

In an initial state in which the tilting operation is not performed at all, the front surface of the antenna device 2 may be disposed vertically in the upward/downward direction, as illustrated in FIG. 14A. In this case, the first tilting link member 500 and the second tilting link member 600 may be kept parallel to each other vertically in the upward/downward direction.

When the tilting drive unit 320 operates to implement beam tilting of the antenna element, the tilting drive unit 320 operates, and the tilting driving power is transmitted from the tilting speed reducer 325 to the tilting rotary shaft 326, as illustrated in FIG. 14B.

In this case, one end of the first tilting link member 500, which is connected to the antenna mounting bracket wing 120, rotates about one point T2 on the other end, as a rotation center, while defining a predetermined swing trajectory.

In this case, the upper end of the antenna mounting bracket 100 tilts forward and downward at a predetermined angle about the fixed lower end. One end of the second tilting link member 600 also rotates about one point T1 on the other end, which is hingedly connected to the steering drive unit 330, as a rotation center, while defining a predetermined swing trajectory by a movement distance of the antenna mounting bracket 100 tilted forward.

In this case, the tilting drive unit 320 also moves forward by the rotation distance of the one end of the second tilting link member 600, such that the tilting drive unit 320 may tilt at a sufficient angle only by a small rotation angle of the first tilting link member 500.

As described above, the clamping apparatus 1 for an antenna device according to the embodiment of the present invention may ensure a maximum tilting adjustment range of the antenna device 2 by means of the first tilting link members 500 and the second tilting link members 600.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims to be described below rather than the detailed description, and it should be interpreted that the meaning and scope of the claims and all the changes or modified forms derived from the equivalent concepts thereto fall within the scope of the present invention.

INDUSTRIAL APPLICABILITY

The present invention provides a clamping apparatus for an antenna device, which is capable of rotating an antenna in an upward/downward direction and a horizontal direction and ensuring a maximum range in which the antenna rotates in the upward/downward direction.

The invention claimed is:

1. A clamping apparatus for an antenna device, the clamping apparatus comprising:

an antenna mounting bracket coupled to a rear surface of an antenna device and configured to support the antenna device;

a steering drive unit coupled to be rotatable in a horizontal direction relative to a support pole mounting bracket installed on a support pole;

a tilting drive unit movably coupled to the steering drive unit; and at least one tilting link member configured to rotate the tilting drive unit relative to the steering drive unit and move the antenna mounting bracket relative to the tilting drive unit during tilting and steering operations.

2. The clamping apparatus of claim 1, wherein the support pole mounting bracket comprises:

an upper support pole mounting bracket installed on the support pole and configured such that the steering drive unit is horizontally rotatably coupled to the upper support pole mounting bracket; and a lower support pole mounting bracket installed on the support pole so as to be disposed below the upper support pole mounting bracket and configured to support a lower portion of the antenna mounting bracket so that the lower portion of the antenna mounting bracket is rotatable in an upward/downward direction and rotatable in the horizontal direction.

3. The clamping apparatus of claim 2, wherein the lower support pole mounting bracket comprises:

a lower support pole mounting main body;

a lower steering part coupled to the lower support pole mounting main body so as to be rotatable in the horizontal direction; and a lower tilting part coupled to the lower steering part so as to be rotatable in the upward/downward direction and coupled to the lower portion of the antenna mounting bracket.

4. The clamping apparatus of claim 1, wherein the at least one tilting link member comprises:

a first tilting link member having one end coupled to an upper portion of the antenna mounting bracket, and the other end rotatably coupled to the tilting drive unit, the first tilting link member being configured to rotate the antenna mounting bracket in an upward/downward direction by driving power of the tilting drive unit; and a second tilting link member having one end coupled to the tilting drive unit, and the other end rotatably coupled to the steering drive unit, the second tilting link member being configured to allow the tilting drive unit to be rotatable in the upward/downward direction relative to the steering drive unit.

5. The clamping apparatus of claim 4, wherein one end of the first tilting link member is hingedly connected to the upper portion of the antenna mounting bracket so as to be rotatable relative to the upper portion of the antenna mounting bracket, and the other end of the first tilting link member is coupled and connected to a tilting rotary shaft of the tilting drive unit to rotate one end thereof by receiving driving power from the tilting drive unit.

6. The clamping apparatus of claim 4, wherein one end of the second tilting link member is fixed to operate in conjunction with the tilting drive unit when the antenna mounting bracket is rotated in the upward/downward direction by the first tilting link member, and the other end of the second tilting link member is hingedly connected to the steering drive unit so as to be rotatable relative to the steering drive unit.

7. The clamping apparatus of claim 4, wherein the tilting drive unit comprises:

a tilting housing;

a tilting speed reducer disposed in the tilting housing and having a tilting worm gear; and a tilting rotary shaft disposed in the tilting housing and having an outer peripheral surface on which a tilting worm wheel gear, which engages with the tilting worm gear, is provided, the tilting rotary shaft being disposed horizontally and coupled to the other end of the first tilting link member.

8. The clamping apparatus of claim 7, wherein a tilting shaft matching part having a concave-convex shape is provided at an outer end of the tilting rotary shaft, a link matching part, which is matched with the tilting shaft matching part, is provided at the other end of the first tilting link member, and the other end of the first tilting link member is coupled by means of a link fastening bolt in a state in which the link matching part is matched with the tilting shaft matching part.

9. The clamping apparatus of claim 4, wherein the antenna mounting bracket comprises:

an antenna mounting bracket body coupled to a rear surface of the antenna device; and an antenna mounting bracket wing protruding from the antenna mounting bracket body toward the support pole and hingedly coupled to one end of the first tilting link member by means of a fixing member.

10. The clamping apparatus of claim 9, wherein the fixing member is provided as a hinge bearing type configured to support a rotation between one end of the first tilting link member and the antenna mounting bracket wing.

11. The clamping apparatus of claim 9, wherein the antenna mounting bracket wing is provided as a pair of antenna mounting bracket wings disposed on a rear surface of the antenna mounting bracket body and spaced apart from each other in the horizontal direction, wherein the first tilting link member is provided as a pair of first tilting link members each having one end coupled to each of the pair of antenna mounting bracket wings, and wherein the pair of first tilting link members has the other ends rotatably and hingedly coupled to two opposite left and right sides of the tilting drive unit, respectively.

12. The clamping apparatus of claim 4, wherein the second tilting link member is provided as a pair of second tilting link members each having one end coupled to each of two opposite sides of the tilting drive unit, and the pair of second tilting link members has the other ends rotatably and hingedly coupled to two opposite left and right sides of the steering drive unit, respectively.

13. The clamping apparatus of claim 4, wherein the other end of the second tilting link member is coupled to the steering drive unit by means of a roller bearing.

14. The clamping apparatus of claim 2, wherein the steering drive unit comprises:

a steering housing;

a steering speed reducer disposed in the steering housing and having a steering worm gear; and a steering rotary shaft disposed in the steering housing and having an outer peripheral surface on which a steering worm wheel gear, which engages with the steering worm gear, is provided, the steering rotary shaft being disposed vertically and coupled to the upper support pole mounting bracket.

15. The clamping apparatus of claim 14, wherein a rotary shaft of the steering worm gear is horizontally disposed to be inclined leftward or rightward in the steering housing.

* * * * *